United States Patent
Lebowsky

(10) Patent No.: US 9,654,784 B2
(45) Date of Patent: May 16, 2017

(54) DIGITAL COLOR IMAGE COMPRESSION METHOD AND DEVICE

(71) Applicant: STMicroelectronics (Grenoble 2) SAS, Grenoble (FR)

(72) Inventor: Fritz Lebowsky, Saint Martin D'uriage (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 36 days.

(21) Appl. No.: 14/929,911

(22) Filed: Nov. 2, 2015

(65) Prior Publication Data
US 2016/0227223 A1    Aug. 4, 2016

(30) Foreign Application Priority Data

Feb. 4, 2015    (FR) .................................... 15 50854

(51) Int. Cl.
| | | |
|---|---|---|
| H04N 1/41 | (2006.01) | |
| H04N 1/64 | (2006.01) | |
| H04N 19/132 | (2014.01) | |
| H04N 19/186 | (2014.01) | |
| H04N 19/117 | (2014.01) | |

(Continued)

(52) U.S. Cl.
CPC ........... *H04N 19/186* (2014.11); *H04N 1/648* (2013.01); *H04N 19/117* (2014.11); *H04N 19/132* (2014.11); *H04N 19/176* (2014.11); *H04N 19/44* (2014.11); *H04N 1/41* (2013.01)

(58) Field of Classification Search
CPC ........ H04N 1/41; H04N 1/648; H04N 19/117; H04N 19/132; H04N 19/176; H04N 19/186; H04N 19/44
See application file for complete search history.

(56) References Cited

U.S. PATENT DOCUMENTS

| | | | |
|---|---|---|---|
| 6,108,381 A | 8/2000 | Pau et al. | |
| 7,194,129 B1 * | 3/2007 | Reinhart | ............... H04N 1/646 382/167 |

(Continued)

FOREIGN PATENT DOCUMENTS

JP    05292546 A * 11/1993

OTHER PUBLICATIONS

PenTile matrix is a family of patented subpixel matrix schemes used in electronic device displays. PenTile is a trademark of Samsung http://en.wikipedia.org/wiki/PenTile_matrix_family as of Oct. 22, 2014.

(Continued)

*Primary Examiner* — Yubin Hung
(74) *Attorney, Agent, or Firm* — Gardere Wynne Sewell LLP

(57) ABSTRACT

An image includes at least first and second digital samples corresponding to first and second different color components. The image is compressed by detecting level changes of a first signal formed of the sequence of the first samples and by detecting level changes of a second signal formed of the sequence of the second samples. A determination is made as to whether the detected changes coincide with each other. The first signal is decimated. The compressed image that is output includes the decimated first signal, the second signal and a further signal indicative of coinciding detected changes.

20 Claims, 3 Drawing Sheets

(51) Int. Cl.
*H04N 19/176* (2014.01)
*H04N 19/44* (2014.01)

(56) References Cited

U.S. PATENT DOCUMENTS

| | | | |
|---|---|---|---|
| 7,512,277 B2* | 3/2009 | Ducksbury | H04N 19/63 375/240 |
| 8,457,436 B2 | 6/2013 | Lebowsky et al. | |
| 2005/0117040 A1* | 6/2005 | Matsutani | H04N 9/045 348/272 |
| 2006/0083432 A1* | 4/2006 | Malvar | H04N 1/64 382/232 |
| 2012/0206582 A1* | 8/2012 | DiCarlo | G06T 3/4015 348/71 |
| 2014/0347449 A1* | 11/2014 | Yamazaki | H04N 13/0257 348/47 |
| 2016/0094823 A1* | 3/2016 | Zhai | H04N 1/646 348/453 |

OTHER PUBLICATIONS

Lebowsky, Fritz: "Optimizing color fidelity for display devices using contour phase predictive coding for text, graphics, and video content," Proc. SPIE. 8652, Color Imaging XVIII: Displaying, Processing, Hardcopy, and Applications, 86520X, Feb. 4, 2013, doi: 10.1117/12.2006775.

Lebowsky, Fritz et al: "Preserving color fidelity for display devices using scalable memory compression architecture for text, graphics, and video," Proc. SPIE. 9015, Color Imaging XIX: Displaying, Processing, Hardcopy, and Applications, 90150M, Jan. 8, 2014, doi: 10.1117/12.2041564.

* cited by examiner

DIGITAL COLOR IMAGE COMPRESSION METHOD AND DEVICE

PRIORITY CLAIM

This application claims the priority benefit of French Application for Patent No. 1550854, filed on Feb. 4, 2015, the contents of which is hereby incorporated by reference in its entirety to the maximum extent allowable by law.

TECHNICAL FIELD

The present disclosure generally relates to the processing of digital data, and more specifically aims at the compression of a digital color image.

BACKGROUND

Generally, the digital images displayed by a screen, for example, a television screen, are first transmitted in compressed form to a decoder connected to the screen, for example, in compression formats such as HEVC, H.264, MPEG, JPEG, etc., which provide high compression rates but require relatively complex calculations for their decoding. The compressed images are decoded by the decoder, which generates digital images to be displayed on the screen. An image to be displayed generated by the decoder corresponds to a pixel array, each pixel including a plurality of values or samples corresponding to the different color components of the image, for example, red, green, and blue components R G, and B or, as a variation, luminosity and chrominance components Y, Cr (corresponding to the difference between blue component B and luminance Y) and Cb (corresponding to the difference between red component R and luminance Y). Such an image, generally called "raster" image, corresponds, pixel by pixel, to the image which should be displayed on the screen. This image is first stored in a video memory of the screen, and then read from this memory, for example, line by line, to be displayed on the screen.

In practice, due to the high resolutions (number of pixels per image) and frequencies (number of images displayed per second) of current screens, the flows of images to be displayed generated by the decoders correspond to highly significant data. This may raise issues, particularly on transmission of the images to be displayed from the decoder to the screen, typically over a wire link, for example, an HDMI link, or during phases of temporary storage of the decoded images in an internal memory of the decoder. In particular, the transfer speeds necessary to transmit the decoded images are particularly high, which raises issues in terms of cost, power consumption, and/or generation of electromagnetic disturbances.

For this reason, the digital images to be displayed generated by the decoder are generally compressed by the latter before being transmitted to the screen.

To perform such a compression, it has especially been provided to use lossless compression methods. Such methods however have relatively low compression rates, and are not always sufficient to meet the encountered constraints.

It has further been provided to use so-called visually lossless compression methods, that is, compression methods generating a loss of information, but where the coding errors introduced are selected to be imperceptible or tolerable for the human eye. Examples of such compression methods are for example described in U.S. Pat. No. 6,108,381 (incorporated by reference), and in the article entitled "A novel adaptive quantization method for memory reduction in MPEG-2 HDTV decoders" by R. Bruni et al. (incorporated by reference).

There is a need for a compression method complementary or alternative to existing methods, which enables to decrease the bandwidth required to transmit images to be displayed, without significantly altering the visual quality of the image.

SUMMARY

Thus, an embodiment provides a method of compressing an initial image including a plurality of pixels, each including at least first and second digital samples corresponding to first and second different color components of the image, the method comprising the steps of: detecting level changes of a first signal formed of the sequence of the first samples of the pixels of a first direction of the image; determining, for each level change of the first signal, whether this level change coincides with a level change of a second signal formed of the sequence of the second samples of the pixels of the first direction; and generating a third signal by sub-sampling of the first signal.

According to an embodiment, the method comprises a step of outputting a compressed image which comprises the second and third signals, and which does not comprise the first signal.

According to an embodiment, the method further comprises a step of generating a fourth digital signal comprising information representative of the correlation of the level changes of the first and second signals in the initial image.

According to an embodiment, the fourth signal has the same resolution as the third signal.

According to an embodiment, the compressed image further comprises the fourth signal.

According to an embodiment, the fourth signal indicates, for each sample of the third signal defining a level change of the third signal, whether the sub-sampling of the first signal performed to obtain the third signal has resulted in a loss of correlation of this level change with a corresponding level change of the second signal.

According to an embodiment, the steps are further implemented for at least a second direction of the image.

According to an embodiment, the first and second directions respectively are the directions of the rows and of the columns of the image.

According to an embodiment, the method further comprises a step of detecting oscillations of the level of the first signal.

According to an embodiment, when oscillations are detected, the first signal is filtered by a low-pass filter before being sub-sampled to generate the third signal.

According to an embodiment, the initial image is an image at the RGB format, and the first component is the blue component of the image.

According to an embodiment, the initial image is an image at the YCbCr format, and the first component is the chrominance component, Cb, of the image.

Another embodiment provides a device comprising a digital circuit capable of implementing the above-mentioned compression method.

Another embodiment provides a device comprising a microprocessor and software means for implementing the above-mentioned compression method.

According to an embodiment, the above-mentioned device comprises: an analysis block capable of detecting level changes of the first signal, and of determining, for each level change of the first signal, whether this level change coincides with a level change of the second signal; and a decimation block capable of generating the third signal by sub-sampling of the first signal.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
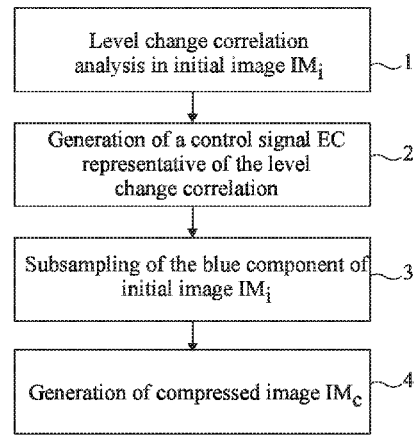
FIG. 1 schematically shows an embodiment of a digital color image compression method.

The same elements have been designated with the same reference numerals in the different drawings. Further, for clarity, only those elements which are useful to the understanding of the described embodiments have been shown and are detailed. In particular, the methods and devices enabling to generate an initial digital color image (the image to be compressed) comprising a plurality of pixels, each comprising a same number greater than 1 (for example, equal to 3) of values or samples corresponding to different color components of the image, have not been detailed. Further, the methods and devices enabling to display such an image on a screen have not been detailed. Further, the possible transfer and/or storage operations to which the compressed images are submitted have not been detailed.

In the following description, an initial digital color image $IM_i$ in RGB format, that is, comprising a pixel sequence, each pixel comprising three digital values or samples respectively corresponding to red, green, and blue components R, G, and B of the pixel is considered as an illustrative example. It will be seen hereafter that the provided compression method can be applied to other color image formats, for example, to images in the YCbCr format.

It has been demonstrated that the human eye is less sensitive to blue light than to red light, and further less sensitive to red light than to green light. The coding inaccuracies of the blue components of an RGB image are less perceptible than the coding inaccuracies of the red component, which are themselves less perceptible than the coding inaccuracies of the green component.

According to an aspect of an embodiment, a compression method comprising a sub-sampling of the blue component of the initial digital image, $IM_i$, is provided to generate a compressed image $IM_c$ having its blue component $B_c$ comprising a decreased quantity of information as compared with the blue component B of initial image $IM_i$, or, in other words, a number of samples lower than the number of pixels of initial image $IM_i$.

However, although the coding inaccuracies of the blue component are visually less perceptible than the coding inaccuracies of the red and green components, a simple sub-sampling of the blue component is in practice not satisfactory alone in terms of visual quality of the image. Indeed, such a sub-sampling, carried out with no particular precaution, may cause visible artifacts on display of the image.

The inventor has observed that such artifacts essentially occur when a level change of blue component B in a direction of initial image $IM_i$ is correlated or in phase with a level change of red component R and/or of green component G in the same direction (independently from the polarity of the level changes/gradients) and that, due to the sub-sampling of the blue component, the corresponding level change of the blue component in final image $IM_f$ reconstructed from compressed image $IM_c$ is shifted by one or a plurality of pixels with respect to the level change of the red component and/or of the green component. In other words, the artifacts visible in final image $IM_f$ may be considerably decreased if the correlation of the level changes of the blue components with the level changes of the red component and/or of the green component is respected in the reconstructed image.

FIG. 1 schematically illustrates steps of an embodiment of a method of compressing an initial digital color image $IM_i$ into a compressed image $IM_c$.

According to an aspect of an embodiment, it is provided to detect the level changes of the blue component B of initial image $IM_i$ in at least one direction of the image, which will be called hereafter the analysis direction, or processing direction, or compression direction. As an example, the detection of the level changes of the blue component is implemented in the direction of the rows of the pixel array, which will be called the horizontal direction hereafter, and/or in the direction of the columns of the pixel array, which will be called the vertical direction hereafter. As a variation or as a complement, the detection may be performed along diagonals of the array, or along directions orthogonal to the array in the case of an image in three dimensions. For each level change of blue component B in the analysis direction, it is provided to determine whether the detected level change coincides or is correlated with a level change of red component R and/or of green component G, that is, whether a level change of red component R and/or green component G has occurred in the same pixel along the same direction. The step of analyzing the correlation of the level changes of the blue component with the level changes of at least another color component of the image corresponds to step 1 of FIG. 1. Such a level change correlation analysis step may for example, without this being a limitation, be performed by means of a contour analysis tools of the type described in U.S. Pat. No. 8,457,436 (incorporated by reference).

The result of the test of correlation of the level changes of the blue component B with the level changes of the red component R and/or the green component G may be transmitted in the compressed image $IM_c$, to be used to reconstruct a final image $IM_f$ in a phase of decompression of image $IM_c$. As an example, a digital control signal EC representative of the correlation of the level changes of the blue component with the level changes of the red and/or green components may be generated and transmitted in compressed image $IM_c$. Such a step of generating signal EC corresponds to step 2 of FIG. 1. As an example, signal EC may comprise the same number of samples as the sub-sampled blue component $B_c$ of compressed image $IM_c$. Signal EC for example indicates, for each sample of blue component $B_c$ of compressed image $IM_c$, whether the sample defines or not, in the analysis direction, a level change corresponding, in initial image $IM_i$, to a level change correlated with a level change of the red component R and/or of the green component G. If the level change correlation analysis is performed along a single direction of image $IM_i$, each sample of signal EC may comprise a single bit. If the level change correlation analysis is performed along a plurality of directions of image $IM_i$, each sample of signal EC may comprise a plurality of bits, for example, one bit per analysis direction.

At a step 3, the blue component B of initial image $IM_i$ is sub-sampled by a factor F greater than 1, for example, by a factor F=2, in the directions where the correlation of the level changes of the blue component B with the level changes of the red component R and/or the green component G has been analyzed, to generate signal $B_c$.

As an example, an initial image $IM_i$ of M columns by N rows of pixels is considered. It is further considered that at steps 1 and 2 of the method of FIG. 1, the analysis of the correlation of the level changes of the blue component B with the level changes of the red component R and/or the green component G is performed along the rows and the columns of image $IM_i$. Further, it is considered that a sub-sampling by a factor F, for example F=2, of blue component B of the initial image, is implemented along horizontal and vertical directions of initial image $IM_i$ to form blue component $B_c$ of the compressed image. Blue component $B_c$ of image $IM_c$ thus comprises (M/F)*(N/F) samples. During steps 1 and 2 of the method of FIG. 1, the level change correlation analysis may be implemented row by row, and column by column, to generate a two-bit signal EC per sample, the first bit carrying the correlation information for horizontal level changes and the second bit carrying the correlation information for vertical level changes.

At a step 4, compressed image $IM_c$ is generated and can be transmitted, for example to be stored in an internal memory of the decoder or of the screen. Compressed image $IM_c$ for example comprises the red component R and the green component G of initial image $IM_i$, the sub-sampled blue component $B_c$, and the signal EC. Compressed image $IM_c$ however does not comprise the blue component B of initial image $IM_i$, which enables to significantly decrease the quantity of transmitted data (by in the order of 25% in the case of a sub-sampling of the blue component by a factor 2 in the horizontal and vertical direction, and in the order of 12.5%—for a square image—in the case of a sub-sampling of the blue component by a factor 2 in the horizontal or vertical direction only).

According to an aspect of an embodiment, it is provided, during a phase of decompressing image $IM_c$, to reconstruct a final blue signal $B_f$ of same resolution as initial blue signal B from sub-sampled signal $B_c$, taking into account control signal EC to respect the correlations existing in initial image $IM_i$ between the level changes of the blue component B and the level changes of the red component R and/or the green component G. As an example, it may be provided to reconstruct, by interpolation from the compressed blue signal $B_c$, an intermediate signal $B_{int}$ of same resolution as initial signal B. Intermediate signal $B_{int}$ may then be corrected to obtain signal $B_f$ while taking into account signal EC to have the level changes of signal $B_f$ coincide with the level changes of the red component R and/or of the green component G of the compressed image when signal EC indicates that these level changes are correlated. Final image $IM_f$ for example comprises red signal R and green signal G of the compressed image, which are not modified with respect to the initial image, and reconstructed blue signal $B_f$.

Figure 2:
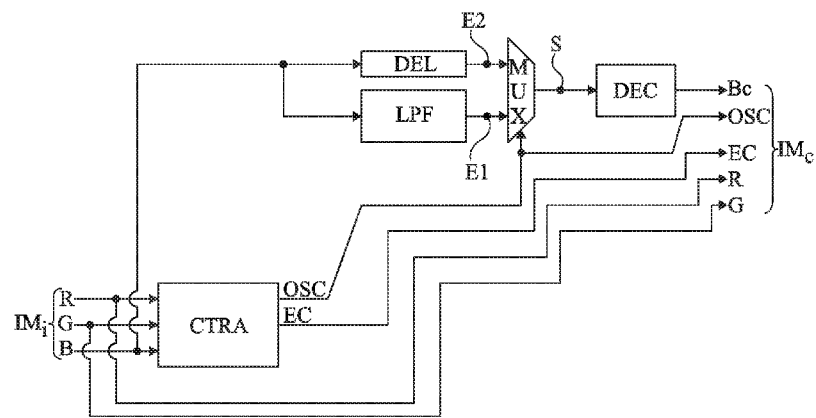
FIG. 2 schematically shows an embodiment of a digital color image compression device.

FIG. 2 schematically shows in the form of blocks an embodiment of a device for compressing a digital color image capable of implementing a compression method of the type described in relation with FIG. 1.

The device receives an input image signal formed of red component R, green component G, and blue component B of initial image $IM_i$ to be compressed. The three R, G, B components are input into a level change analysis block or circuit CTRA, which implements steps 1 and 2 of the method of FIG. 1. Block CTRA is particularly capable of testing the correlation between the level change of the blue component B and the level changes of one and/or the other of the red component R and the green component G, and of generating a signal EC representative of the result of this correlation test.

In this example, analysis block CTRA is further capable of detecting certain parasitic behaviors of the blue component B of initial image $IM_i$, which are incompatible with the provided compression method. In particular, analysis block CTRA is capable of detecting possible oscillations of signal B at the Nyquist frequency in the analysis direction, that is, an alternation of positive and negative level changes of blue component B in the analysis direction (for example, a sequence of consecutive blue samples such that the difference between two successive samples in the sequence are alternately positive and then negative). The result of this detection is output by block CTRA in the form of a digital signal OSC, for example, a binary signal indicating whether the signal is compatible or not with the compression method described in relation with FIG. 1.

In this example, digital signal OSC controls a multiplexer MUX with two inputs E1 and E2 and one output S.

A first input E1 of multiplexer MUX is connected to the output of a low-pass filtering block or circuit LPF which receives blue component B of initial image $IM_i$ as an input. As non-limiting examples, low-pass filter LPF averages the blue samples over a horizontal sliding window of 2 pixels, or averages the blue samples over a vertical sliding window of 2 pixels, or averages the blue samples over a bidimensional sliding window of 2*2 pixels. The output signal of low-pass filter LPF has, in this example, the same number of samples as input signal B.

A second input E2 of multiplexer MUX is connected to the output of a delay block or circuit DEL which receives blue component B of initial image $IM_i$ as an input. Block DEL outputs a signal identical to signal B, delayed by a delay identical to the delay introduced by low-pass filter LPF between its input and its output.

Output S of multiplexer MUX is connected to an input of a detection block or circuit DEC which detects the sub-sampling of blue component B of image $IM_i$ (step 3 of FIG. 1). The output of decimation block DEC delivers the sub-sampled blue signal $B_c$ of compressed image $IM_c$.

When blue component B of initial image $IM_i$ exhibits no oscillations incompatible with the compression method of FIG. 1, multiplexer MUX is controlled by signal OSC so that its input E2 is connected to its output S. The signal sub-sampled by decimation block DEC to generate signal $B_c$ thus is signal B of initial image $IM_i$.

When blue component B of initial image $IM_i$ exhibits oscillations incompatible with the compression method of FIG. 1, multiplexer MUX is controlled by signal OSC so that its input E1 is connected to its output S. The signal sub-sampled by decimation block DEC to generate signal $B_c$ thus is the output signal of filter LPF.

In the example of FIG. 2, compressed output image $IM_c$ comprises unmodified input signals R and G, signal $B_c$, and signals EC and OSC generated by block CTRA, with the possibility for signal OSC to be included in signal EC.

Figure 3:
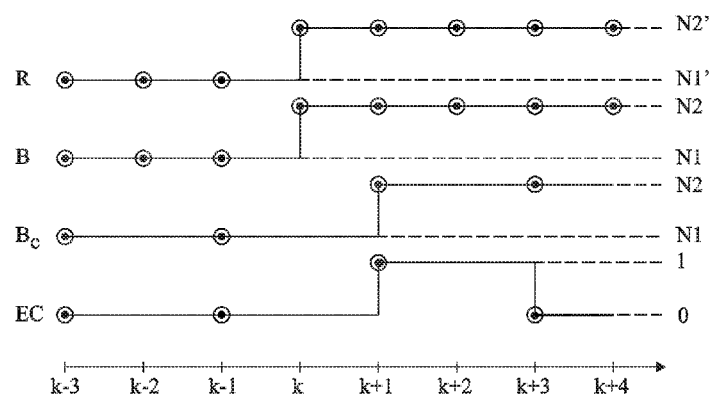
FIGS. 3 and 4 are diagrams schematically illustrating an embodiment of a method of compressing a digital color image of the type described in relation with FIGS. 1 and 2.
Figure 4:
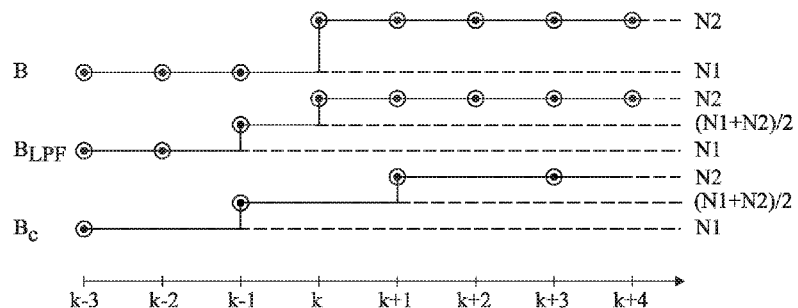

FIGS. 3 and 4 are diagrams schematically illustrating embodiments of a method of compressing a digital color image of the type described in relation with FIGS. 1 and 2.

FIG. 3 shows the case where blue signal B exhibits no oscillations incompatible with the method of FIG. 1. The level change correlation control is accordingly activated. FIG. 3 shows the red and blue samples R and B of a sequence of 8 pixels of initial image $IM_i$, consecutive in the considered processing direction, of respective ranks k−3, k−2, . . . , k+3, k+4 (for example, consecutive pixels of a same row or of a same column of initial image $IM_i$). This drawing further shows signal $B_c$ corresponding to the sub-sampled blue component transmitted in compressed image $IM_c$, and control signal EC. The samples of the different signals are shown in the form of a black dot in a circle.

In the shown example, samples k−3, k−2, and k−1 of blue signal B have a same level N1, and a level change to a level N2 occurs on sample k of signal B. Samples k+1, k+2, k+3, k+4 of signal B are at the same level N2 as sample k.

Further, in this example, samples k−3, k−2, and k−1 of red signal R have a same level N1', and a level change to a level N2' occurs on sample k of signal R. Samples k+1, k+2, k+3, k+4 of red signal R are at the same level N2' as sample k.

Thus, the level change of blue signal B on sample k coincides with a level change of red signal R. Such a correlation is detected on analysis of the level change correlation by block CTRA of the device of FIG. 2 (at steps 1 and 2 of the method of FIG. 1).

In the example of FIG. 3, signal $B_c$ is generated by sub-sampling by a factor 2 of signal B. For example, signal $B_c$ is only formed by the samples of even rank or by the samples of odd rank of signal B. In the shown example, only the samples of rank k−3, k−1, k+1, and k+3 of signal B are transmitted in signal $B_c$.

In the example of FIG. 3, signal EC is a binary signal indicating, for each sample of signal $B_c$, whether the sample defines (EC=1) or not (EC=0), in the analysis direction, a level change corresponding, in initial image $IM_i$, to a level change correlated with a level change of red component R. Thus, in the example of FIG. 3, samples k−3, k−1, and k+3 of signal EC are at value 0, and sample k+1 of signal EC is at value 1.

It should be noted that in the case (not shown) where red signal R should comprise no level change on the pixel of rank k (for example, should it comprise no level change at all or should it comprise a level change on a pixel having another rank), all the samples of signal EC would take value 0.

FIG. 4 shows the case where the level change correlation control is deactivated and where the blue signal transmitted in compressed image $IM_c$ is obtained by sub-sampling of the output signal of filter LPF of FIG. 2. FIG. 4 shows, in the same way as in the example of FIG. 3, the blue samples B of a pixel sequence of initial image $IM_i$. Output signal $B_{LPF}$ of filter LPF and signal $B_c$ corresponding to the sub-sampled blue component transmitted in compressed image $IM_c$ have further been shown.

In the shown example, blue signal B is the same as in the example of FIG. 3.

In this example, the low-pass filtering performed by filter LPF is an averaging over a 2-pixel sliding window. Thus, samples k−3 and k−2 of signal $B_{LPF}$ are at level N1, sample k−1 of signal $B_{LPF}$ is at level (N1+N2)/2, and samples k to k+4 of signal $B_{LPF}$ are at level N2.

In this example, signal $B_c$ is generated by sub-sampling signal $B_{LPF}$ by a factor 2. For example, signal $B_c$ is formed by the samples of even rank or by the samples of odd rank of signal $B_{LPF}$ only. In the shown example, only the samples of rank k−3, k−1, k+1, and k+3 of signal $B_{LPF}$ are transmitted in signal $B_c$.

Figure 5:
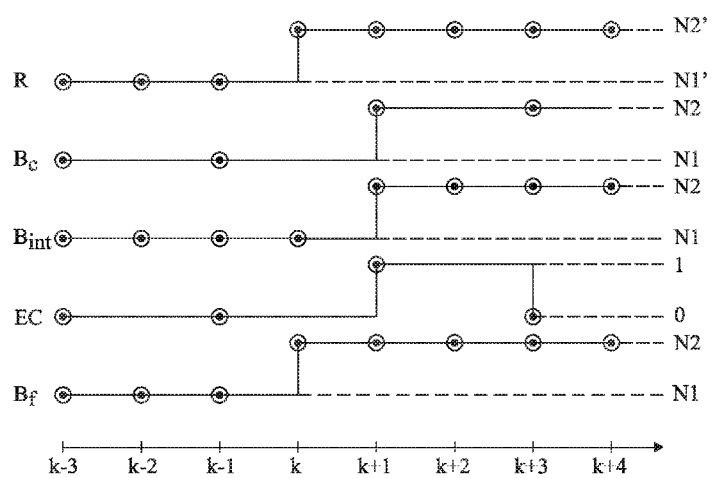
FIGS. 5 and 6 are diagrams schematically illustrating an embodiment of a method of decompressing a digital color image compressed according to a method of the type described in relation with FIGS. 1 and 2.
Figure 6:
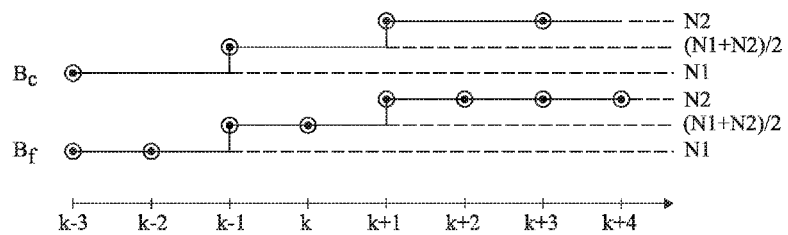

FIGS. 5 and 6 are diagrams schematically illustrating embodiments of a method of decompressing a digital color image $IM_c$ compressed according to a method of the type described in relation with FIGS. 1 and 2.

FIG. 5 shows the case of an image compressed according to a method of the type described in relation with FIG. 1, that is, a case where a control signal EC representative of the correlation of the level changes of the blue components with the level changes of the red and/or green components has been determined on compression and transmitted in compressed image $IM_c$. FIG. 5 shows the red samples R of a sequence of 8 pixels of compressed image $IM_c$, consecutive in the considered processing direction, of respective ranks k−3, k−2, . . . , k+3, k+4 (for example, consecutive pixels of a same row or of a same column of compressed image $IM_c$). In this example, the red samples R of compressed image $IM_c$ are identical to the red samples R of initial image $IM_i$. FIG. 5 further shows signal $B_c$ corresponding to the sub-sampled blue component transmitted in compressed image $IM_c$, control signal EC transmitted in compressed image $IM_c$, an intermediate signal $B_{int}$, and reconstructed blue signal $B_f$ of final image $IM_f$.

In the shown example, signals R, $B_c$, and EC are the same as in the example of FIG. 3.

First, an intermediate blue signal $B_{int}$ of same resolution as initial signal B may be reconstructed by interpolation from the signal $B_c$ only, for example, by inserting between two successive samples of signal $B_c$ an intermediate sample of same value as the first one of the two samples of signal $B_c$ (for example, that having the lowest rank). Thus, in this example, samples k−3, k−2, k−1, and k of signal $B_{int}$ are at level N1, and samples k+1, k+2, k+3, and k+4 of signal $B_{int}$ are at level N2.

Intermediate signal $B_{int}$ can then be corrected by taking signal EC into account to obtain blue component $B_f$ of the final image. In the example of FIG. 5, signal EC indicates that the level change occurring at rank k+1 in signal $B_c$ corresponds to a level change correlated with a level change of the red component. Now, the corresponding level change in intermediate signal $B_{int}$ does not coincide with a level change of red signal R. The decompression circuit then generates, from signals $B_{int}$ and EC, a final signal $B_f$ where the change from level N1 to level N2 occurs on the sample of same rank k as the red sample having the change from level N1' to level N2' occurring thereon.

It should be noted that in a preferred embodiment, the decompression of blue signal $B_c$ taking into account control signal EC is performed without looking up red signal R and green signal G. To achieve this, during the compression, it is provided to mark, via signal EC, only the samples of signal $B_c$ which should effectively be corrected on decompression. For example, if, during the compression, the correlation analysis identifies a level change of blue component B correlated with a level change of red component R, but, during the sub-sampling of blue component B, the correlation of the level changes is preserved in the compressed image, signal EC may be maintained at value 0. During the reconstruction, it may then be provided, without looking up red signal R of compressed image $IM_c$, to systematically shift by one rank, for example, leftwards, all the level changes of intermediate signal $B_{int}$ for which signal EC is at value 1. As a variation, in the case where the sub-sampling of blue signal B is performed with a sub-sampling rate greater than 2, signal EC may comprise a plurality of bits per compression direction, and indicate the number of shifts to be applied to each level change of $B_{int}$ to recover the level change correlations of the initial image.

FIG. 6 shows a case where the level change correlation control has been deactivated on compression. In this case, the compression of the blue component has been obtained by low-pass filtering (by block LPF of FIG. 2), followed by a sub-sampling.

FIG. 6 shows samples of blue component $B_c$ of the compressed image, and corresponding samples of blue component $B_f$ of the final image. In the shown example, signal $B_c$ is the same as in the example of FIG. 5. Signal $B_f$ is obtained by interpolation of signal $B_c$, for example, by linear interpolation.

Specific embodiments have been described. Various alterations, modifications, and improvements will readily occur to those skilled in the art.

In particular, an embodiment of a digital color image compression method applied to the case of an image in RGB format has been described hereabove. In this example, the blue component of the image is sub-sampled to decrease the quantity of data, and information relative to the correlation of the level changes of the blue component with the level changes of the red and/or green components are transmitted in the compressed image. To further increase the compression rate, this same compression method may further be applied not only to the blue component, but also to the red component and/or to the green component.

Further, the described embodiments are not limited to the case where initial image $IM_i$ to be compressed is in RGB format. More generally, the described embodiments apply to any color image format comprising at least two components per pixel. As an example, the described embodiments apply to images in the YCrCb format. In this case, the provided compression method will be mainly applied to chrominance component Cb, which has less visually perceptible degradations than the Y and Cr components.

Further, other known compression methods, for example, lossless compression methods or visually lossless compression methods may be applied downstream of the provided method, to further decrease the volume of the data to be transmitted.

The compression method described in relation with FIG. 1 comprises a phase of analyzing the correlation of the level changes of at least one component of the image with level changes of at least another component of the image. In the present description, a level change of an image component is a variation of the value of the component between two neighboring pixels of the image. In a preferred embodiment, the compression method takes into account all the level changes in the considered compression direction, whatever their amplitude. Thus, a variation even of a least significant bit of the considered color component between two neighboring pixels will be considered as a level change. As a variation, a minimum amplitude threshold beyond which variations between neighboring pixels are not considered as level changes may be provided.

Further, an example of a method of decompressing an image compressed according to a compression method of the type described in relation with FIGS. 1 and 2 has been described hereabove. It should be noted that in certain applications, for example, in the case where the screen comprises a number of blue pixels smaller than the number of red or green pixels by a factor identical to the sub-sampling factor applied to the blue component during the compression, compressed image $IM_c$ may be directly used as the image to be displayed, with no decompression.

Further, the described embodiments are not limited to the examples described hereabove as to the format of digital control signal EC representative of the correlation of the level changes of the blue component with the level changes of the red and/or green components. As a variation, there may exist a shift of one or a plurality of samples in the upstream direction or in the downstream direction between signal EC and signal $B_c$. Further, in the case where signal EC is a binary signal, the meanings of value 1 and of value 0 of signal EC may be inverted with respect to what has been described hereabove. Further, signal EC may have a resolution different from that of compressed blue signal $B_c$, for example a resolution equal to that of non-compressed blue signal B.

Further, the described embodiments are not limited to the specific example described in relation with FIG. 2 of a device capable of implementing the compression method. More generally, it will be within the abilities of those skilled in the art to provide other devices capable of implementing this method, for example, devices based on digital electronic circuits, or devices based on one or a plurality of microprocessors where the method is implemented in software form, that is, where a computer program comprising software code portions for the execution of the compression method is loaded into a memory of the device, to be executed by the microprocessors. It should in particular be noted that in the example of FIG. 2, blocks CTRA, DEL, LPF, MUX, and DEC may be provided in the form of digital electronic circuits or, as a variation, in software form.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method of compressing an initial image including a plurality of pixels, each pixel including at least first and second digital samples corresponding to first and second different color components of the initial image, respectively, the method comprising the steps of:
   detecting level changes of a first signal formed by a sequence of the first digital samples of the pixels in a first direction of the initial image;
   determining, for each level change of the first signal, whether this level change coincides with a level change of a second signal formed by a sequence of the second digital samples of the pixels in the first direction of the initial image; and
   generating a third signal by sub-sampling of the first signal.

2. The method of claim 1, further comprising a step of delivering a compressed image which comprises the second and third signals, and which does not comprise the first signal.

3. The method of claim 2, further comprising a step of generating a fourth signal comprising information representative of the coincidence of the level changes of the first and second signals.

4. The method of claim 3, wherein the fourth signal has a same resolution as the third signal.

5. The method of claim 3, wherein the compressed image further comprises the fourth signal.

6. The method of claim 3, wherein the fourth signal indicates, for each sample of the third signal defining a level change of the third signal, whether the sub-sampling of the first signal performed to obtain the third signal has resulted in a loss of correlation of this level change with a corresponding level change of the second signal.

7. The method of claim 1, wherein said steps of detecting and determining are further implemented for at least a second direction of the initial image.

8. The method of claim 7, wherein the first and second directions respectively are the directions of the rows and of the columns of the initial image.

9. The method of claim 1, further comprising a step of detecting oscillations of the level of the first signal.

10. The method of claim 9, further comprising, when oscillations are detected, filtering the first signal by a low-pass filter before being sub-sampled to generate the third signal.

11. The method of claim 1, wherein the initial image is an image in an RGB format, and wherein the first signal relates to the blue component of the image.

12. The method of claim 1, wherein the initial image is an image in a YCbCr format, and wherein the first signal relates to the chrominance component of the image.

13. A device for compressing an initial image including a plurality of pixels, each pixel including at least first and second digital samples corresponding to first and second different color components of the initial image, respectively, comprising:
  means for detecting level changes of a first signal formed by a sequence of the first digital samples of the pixels in a first direction of the initial image;
  means for determining, for each level change of the first signal, whether this level change coincides with a level change of a second signal formed by a sequence of the second digital samples of the pixels in the first direction of the initial image; and
  means for generating a third signal by sub-sampling of the first signal.

14. The device of claim 13, wherein said means for detecting, means for determining and means for generating comprise a digital circuit configured to implement the recited functions for detecting, determining and generating.

15. The device of claim 13, wherein said means for detecting, means for determining and means for generating comprise a microprocessor executing software configured to implement the recited functions for detecting, determining and generating.

16. The device of claim 14, wherein said digital circuit comprises: an analysis circuit configured to detect level changes of the first and second signals and determine coincidences of level changes between the first signal and the second signal.

17. The device of claim 14, wherein said digital circuit comprises: a decimation circuit configured to generate the third signal by sub-sampling of the first signal.

18. The device of claim 14, wherein said digital circuit comprises:
  an oscillation detection circuit configured to detect oscillation in said first signal; and
  a selective filtering circuit configured to selectively low pass filter the first signal before sub-sampling in response to detected oscillation.

19. A method, comprising:
  receiving a sequence of images, each image in the sequence of images including a first color component and a second color component;
  detecting corresponding level changes in the first and second color components with respect to consecutive images in said sequence of images;
  generating a first signal indicative of said detected corresponding level changes;
  decimating the first color component to generate a decimated first color component; and
  outputting a sequence of compressed images, each image in the sequence of compressed images including the decimated first color component, the second color component and the first signal.

20. The method of claim 19, further comprising:
  detecting oscillation in the first color component for the consecutive images in the sequence of images; and
  selectively low pass filtering the first color component prior to decimating if oscillations are detected.

* * * * *